United States Patent [19]  [11] 3,922,478
Perkey  [45] Nov. 25, 1975

[54] UTILITY STRUCTURE USABLE AS ELECTRICAL WIRING EQUIPMENT
[76] Inventor: Preston R. Perkey, R.D. No. 1, Box 301, New Bloomfield, Pa. 17068
[22] Filed: Oct. 15, 1974
[21] Appl. No.: 514,434

[52] U.S. Cl. .................. 174/53; 339/18 R; 339/222
[51] Int. Cl.² .......................................... H02G 3/18
[58] Field of Search ........... 174/53; 339/18 R, 18 B, 339/18 C, 18 P, 208, 209, 222

[56]  References Cited
UNITED STATES PATENTS

| | | | |
|---|---|---|---|
| 2,920,303 | 1/1960 | Johnson | 174/53 UX |
| 3,038,141 | 6/1962 | Chiuchiolo | 174/53 X |
| 3,157,732 | 11/1964 | Richards | 174/53 |
| 3,716,651 | 2/1973 | Werner | 174/53 |

Primary Examiner—J. V. Truhe
Assistant Examiner—David A. Tone
Attorney, Agent, or Firm—Philip D. Freedman, Esq.

[57] ABSTRACT

A utility structure that is useable as electrical wiring equipment comprises a base housing and a cover; the base housing having at least four recessed couplers for engaging conductive wiring, longitudinal grooves in the base running between the recessed couplers in pairs, and conductors mounted in the grooves and exposed to the exterior of the base and running between the recessed couplers in pairs, at least one of the conductors running between but not completely connecting one of the pairs to form an interrupted connection, and at least one of the conductors running between and completely connecting a pair of couplers to form a complete connection; and a cover fitable over the base and attached to it to cover the exposed grooves with mounted conductors and the cover further characterized as having at least one adjustable conductive jumper tap bar for connecting two or more conductors and the cover further preferably having at least one removable conductive tap bar for completing the connection between the incompletely connected conductor in the base.

4 Claims, 10 Drawing Figures

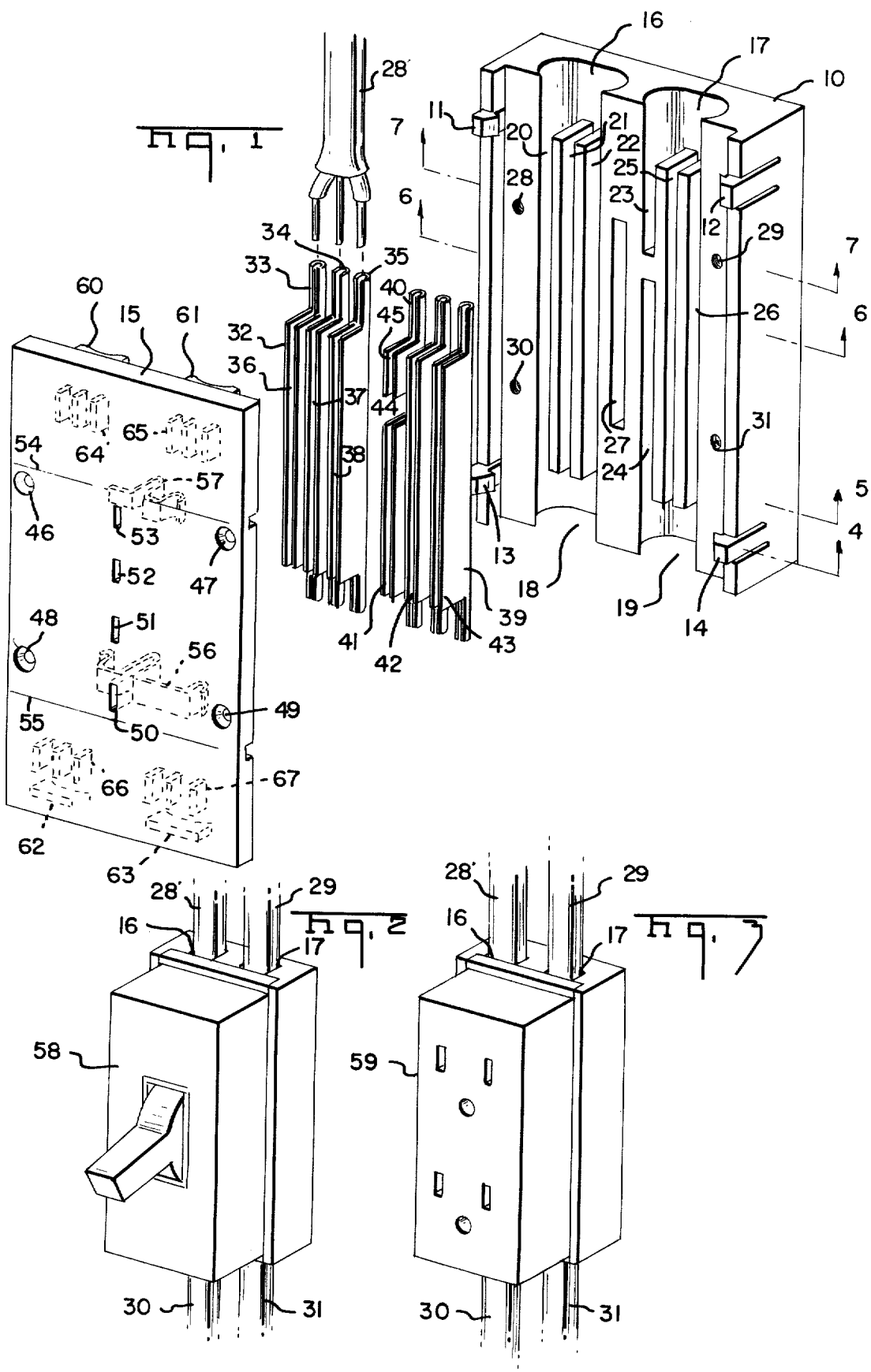

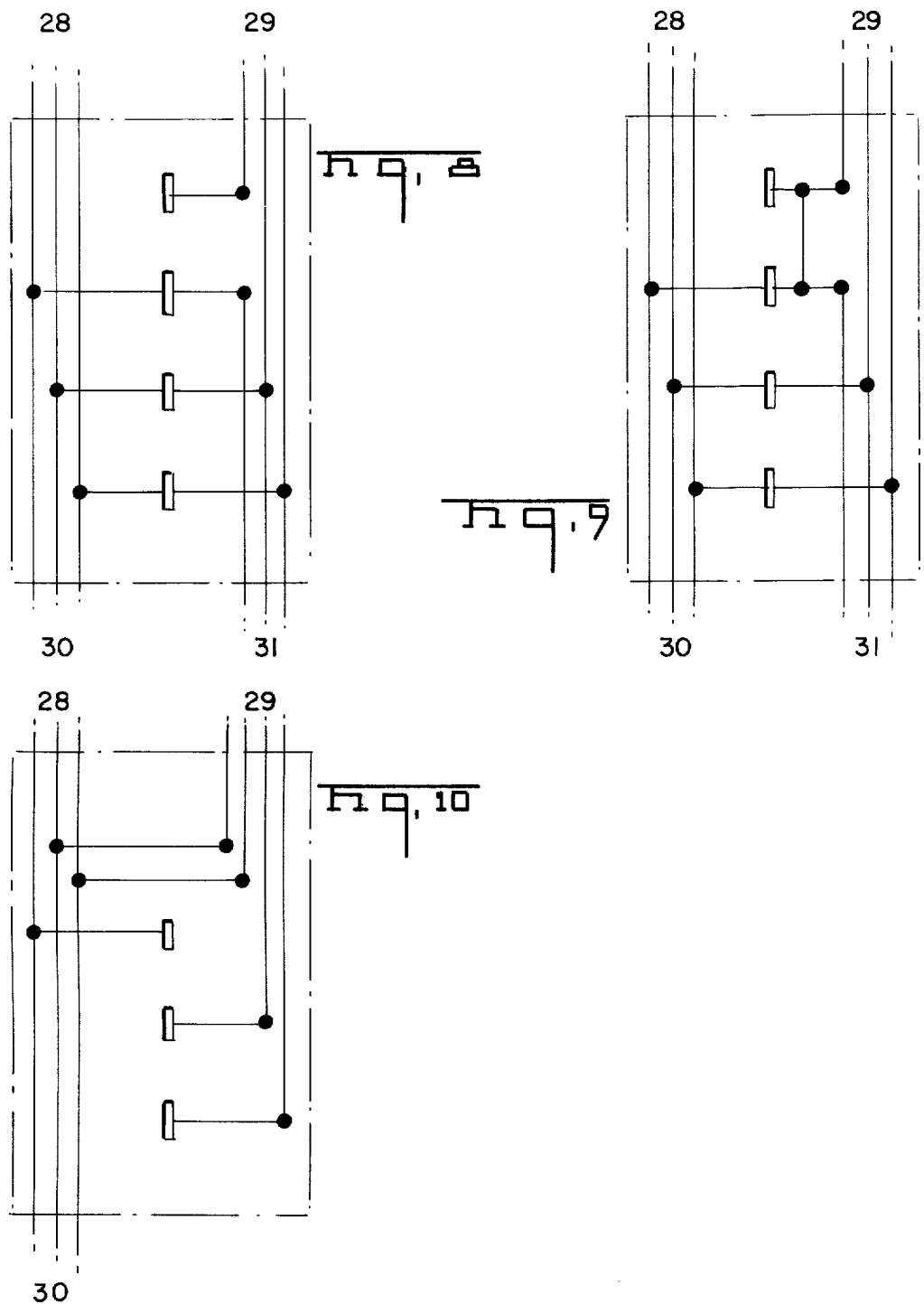

UTILITY STRUCTURE USABLE AS ELECTRICAL WIRING EQUIPMENT

This invention relates to electrical wiring equipment and particularly to an article of manufacture that is the basic structure in a system of house wiring that may be used to replace conventionally used junction boxes, switches and outlets. Among the advantages of the system of which the present invention is a part is that a single basic structure may be adapted to replace all of the above-mentioned units and further than the structure may be adapted to eliminate hand splicing of connections.

The advantages of the present invention are similar to those of the invention disclosed by Richards, U.S. Pat. No. 3,157,732; but are provided by a simple inexpensive structure. As in Richards, the article of manufacture of this invention, which may be characterized as a utility structure, may be conveniently installed in a building. Numerous types of plug-in accessories may then conveniently be connected to the utility structure so that the resulting combination unit may operate as a switch, a junction box, a socket, a three-way switch or otherwise.

As noted by Richards, the various types of electrical junction boxes used in the art have provided binding posts or other threaded means for attaching wires or cable. The boxes do not provide any means for connecting accessories such as switches, light fixtures, clocks or thermostats. Generally, switches or outlets or the like are provided as integral parts of the junction box so that only that accessory can be used in its installed location and the entire unit would need be removed and replaced in order to change the function of that location.

In the present invention a single basic structure is provided which may be simply installed at a number of locations within a building and which may be there utilized for a variety of functions. The invention is an article of manufacture comprising (a) a base housing having (i) at least four recessed couplers for engaging conductive wiring, (ii) longitudinal grooves in said base running between said recessed couplers in pairs, and (iii) conductors mounted in said grooves and exposed to the exterior of said base and running between the recessed couplers in pairs, at least one of said conductors running between, but not completely connecting, one of the pairs of couplers to form an interrupted connection and at least one of said conductors running between and completely connecting a pair of couplers to form a complete connection, and (b) a cover fitable over said base and attached thereto to thereby cover the exposed grooves with mounted conductors and characterized as having at least one adjustable conductive jumper tap bar for connecting two or more conductors. When the article of manufacture of the present invention is utilized as a junction box the cover (b) may be further characterized as having at least one removable conductive tap bar for completing the connection between the incompletely connected conductor in the base.

The present invention is advantageous in that by use of the novel interrupted circuit described above, a variety of extremely simple accessory units may be used in connection therewith while with prior art devices each accessory unit would need to be a rather complex device. Thus, in the prior art devices the accessory unit would need to provide the complete circuitry between the cables attached to the base unit so as to function as a junction box, switch, etc. With the present invention, for example, to function as a junction box, the utility structure cover would need only be provided with a conductor to complete the interrupted connection and, in fact, no additional unit would need be provided. When used in more complex functions the additional unit would be correspondingly simplified over prior art unit devices.

Further, a single utility structure of the present invention may provide more than one function at one location. Thus, the utility structure of the present invention may be utilized as a junction box with regard to one circuit while it may be used as a switch at the very same time with regard to another circuit.

Other features and advantages of the invention will be readily apparent from the following description of certain preferred embodiments taken in conjunction with the accompanying drawings, although variations and modifications may be effected without departing from the spirit and scope of the novel concepts of the disclosure.

FIG. 1 is an exploded perspective view of the base housing of the present invention.

FIGS. 2 and 3 are perspectives showing the invention used as a multi-part electrical unit combining in FIG. 2, the base housing with a switch and in FIG. 3, the housing with a socket unit.

FIG. 8 is a wiring diagram showing the base housing of the present invention and appropriate combination unit used as a switch and receptacle.

FIG. 9 is a wiring diagram showing the base housing of the present invention used as a junction box.

FIG. 10 is a wiring diagram showing the base housing of the present invention and appropriate combination unit used as a three-way switch.

Figure 4:
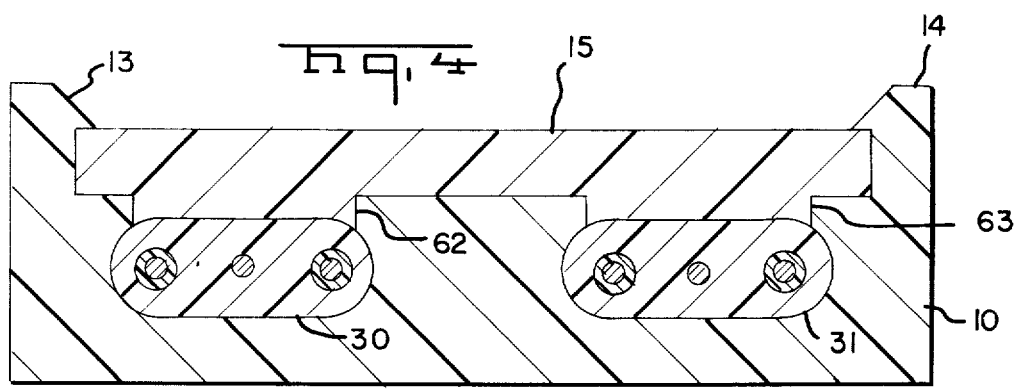
FIG. 4 is a sectional view taken on the line 4—4 of FIG. 1, and showing the manner in which electrical cables approach the contact elements of the base.
Figure 5:
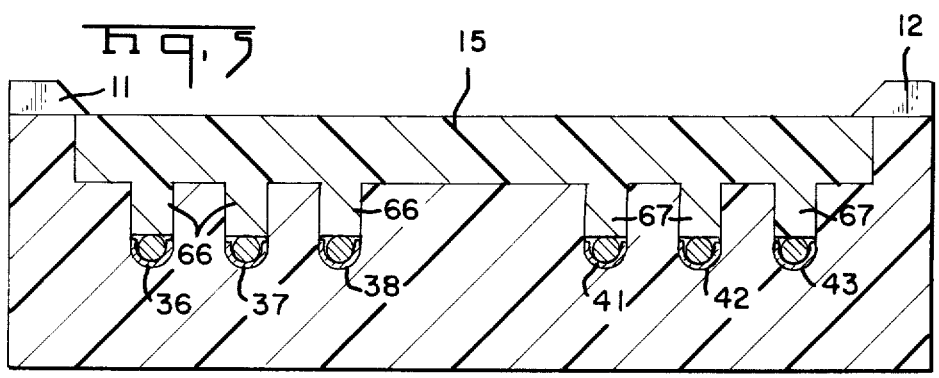
FIG. 5 is a sectional view taken on the line 5—5 of FIG. 1, and showing the manner in which the electrical cables are secured to the base in connection with the contact elements.
Figure 6:
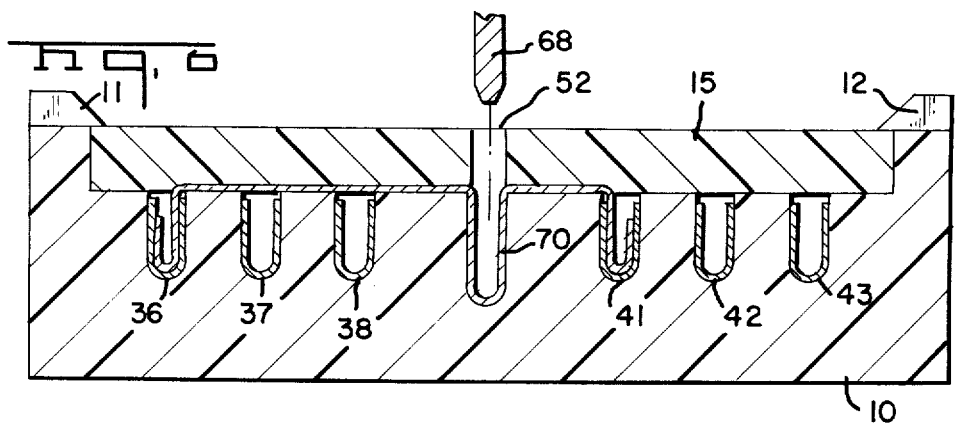
FIG. 6 is a sectional view taken along the line 6—6 of FIG. 1, and showing a typical jumper tap bar connection.
Figure 7:
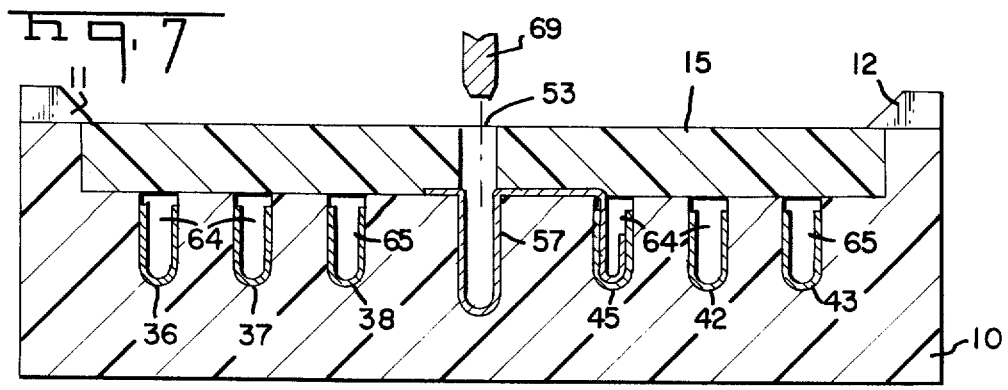
FIG. 7 is a sectional view taken along the line 7—7 of FIG. 1 and showing a jumper tap bar completing the circuit of an interrupted conductor as hereinafter defined and described.

With reference to these drawings, and particularly FIGS. 1, 4, 5, 6 and 7, there is shown a housing comprising a generally rectangular base 10 made out of an appropriate non-conducting material such as polypropylene or polyvinylchloride and being of sufficient flexibility so as to provide clip fasteners 11, 12, 13 and 14 having slightly beveled heads and being biased inwardly for the accepting and fastening of a portion of fitable cover 15 as hereinafter described. The base 10 is further is provided with recesses 16, 17, 18 and 19 for the insertion of electrical cable and longitudinal grooves 20, 21, 22, 23, 24, 25 and 26 running substantially the length of said base. Also provided is longitudinal groove 27 and further screw holes 28, 29, 30 and 31 provided for the further securing of cover 15. The base is shaped so as to expose said grooves 20, 21, 22, 23, 24, 25, 26 and 27 for the accepting of contact elements as either part of cover 15 in the form of jumper tap bars or as from an attached unit as part of multi-part electrical group all of which will be described in detail.

A typical cable 28' is shown with an energizable line and a ground and neutral for attaching to conductive insert 32 at projecting legs or couplers 33, 34 and 35. The insert 32 is shaped to fit within grooves 20, 21 and 22 of base 10 and to provide U-shaped recessed conductors 36, 37 and 38 with coupler ends 33, 34 and 35 that when inserted run longitudinally in said grooves 20, 21 and 22 between the cable 28' and recess 18 at which point another cable 30 may be attached.

A corresponding insert is shown in two parts 39 and 40. That the insert is in two parts is one of the novel characteristics of the present invention since when inserted into corresponding groove 23 and corresponding grooves 24, 25 and 26, an interrupted connection is formed. Part 39 provides U-shaped conductors 41, 42 and 43 which when fitted into grooves 24, 25 and 26 of base 10 may connect with a cable 31 to form an energized line and a ground and neutral. The energized line must be formed by conductor 41 so that the line is interrupted as shown 44 and does not complete a circuit unless a tap bar or other conductor completes the gap 44 between conductor 41 of part 39 and conductor 45 with coupler end (fitted into groove 23) formed by part 40. Part 40 (with coupler end) is shaped so as to accept the energized line of a cable 29 and to complete the circuit between the line of a cable 31 connected to 39 when a tap bar or other conductor is fitted to bridge the gap 44.

Another unique feature of the present invention is presented by cover 15 which may be provided with adjustable and variable tap bars. These bars may be changed in configuration so as to provide a variety of circuitry within the article of manufacture of the present invention thereby lending itself to a variety of functions. Alternatively, the cover may be manufactured with permanently positioned tap bars but the cover may be interchangeable with a variety of other covers with different configurations of tap bars so as to again provide a number of functional uses to the article of manufacture of the present invention.

Referring again to the drawings, FIG. 1 shows a cover 15 provided with holes 46, 47, 48 and 49 for securing to the base by means of screws and slots 50, 51, 52 and 53 for the accepting of blade taps of switch or socket units 58 and 59 or other units or connectors which are adaptable to this invention. The cover 15 is made of a risilient but flexible plastic or plastic-like material and is foldably creased at 54 and 55. When said cover 15 is in place, secured on top of the base, the cover ends may be raised for the accepting of a cable inserted at recesses 16, 17, 18 and 19 and then the ends may be lowered and snapped into place on the base. The cover also is provided with clamps 60, 61, 62 and 63 positioned to grasp inserted cable across its transverse axis and, with sets of clamps 64, 65, 66 and 67 which fit within the grooves 20, 21 and 22 and 23, 24, 25 and 26 of base, 10 to clamp stripped wires from inserted cable.

In FIG. 1, the cover 15 is provided with jumper tap bars 56 and 57. Tap bar 56 connects neutrals 38 and 43. Not shown are tap bars connecting grounds 37 and 42. Tap bar 70, shown in FIG. 6, but not in FIG. 1, connects energized lines 36 and 41. These later described tap bars are analogously shaped to bar 56 and are located on the underside of the housing cover respectively at slots 51 and 52.

When the article of manufacture of the present invention is used as a junction box a conductor having two blade taps 68 and 69 is fitted over the cover of the housing through 52 and 53 to connect tap bar 57 with the jumper tap bar 70 (shown in FIG. 6) connecting energized lines between conductors 41 and 45, thereby bridging the gap 44 and completing the circuit between line 41 and 45. Current through 30 is thereby junctured to lines 29 and 31 as well as 28.

FIG. 8 is a diagram of the circuitry of the base housing of FIG. 1. When used as a base for duplex receptacles, current entering through line 28 can feed through and out lines 30 and 31. Current also feeds the tap bars under slots 50, 51 and 52 (FIG. 1) into which stabs on the back of duplex receptacles or other device may be plugged.

When used as a base for single pole switches, line voltage thermostats or other control devices, current entering through line 28 can feed through and out lines 30 and 31. Controlled current is channeled to the current interrupting device through the tap bar 70 (FIG. 6) out of the control device through the tap bar 57 (FIG. 7) to line 29 and thence to the controlled appliance.

FIG. 9 is a diagram of the circuit of the base housing of FIG. 1 used as a junction box. A jumper inserted through slots 52 and 53 in the cover bridges the gap between conductors 41 and 45 allowing current entering at any of the four positions 28, 29, 30 or 31 to leave at the remaining three positions.

FIG. 10 is a diagram of the circuitry of the base housing, FIG. 1, used as a base for three-way switches. Current entering through line 28 feeds through and out line 30. Current is also junctured through tap bars and the three-way switch which is plugged into the tap bars under slots 50, 51 and 52, out line 29 to the appliance controlled by the switch.

It will be readily appreciated that many deviations may be made from the specific embodiments disclosed in these drawings without departing from the invention. Accordingly it is intended to cover all such modifications as within the scope of this invention.

What is claimed is:

1. An article of manufacture having a variety of uses in housewiring comprising:
   a. a base housing having:
      i. at least a first pair of couplers and a second pair of couplers for engaging conductive wiring;
      ii. a first groove in said base running between said couplers of the first pair of couplers and a second groove in said base running between said couplers of the second pair of couplers, and
      iii. conductors mounted in said grooves and exposed to the exterior of said base and running between the pairs of couplers, at least one of said conductors running between, but not completely connecting, said first pair of couplers to form an interrupted connection and at least one of said conductors running between and completely connecting said second pair of couplers to form a complete connection; and
   b. a cover fitted over said base and attached thereto to thereby cover the exposed grooves and mounted conductors and characterized as having at least one adjustable conductive jumper tap bar connecting two or more conductors.

2. The article of claim 1 wherein the cover (b) is further characterized as having at least one removable conductive tap bar completing the connection between said incompletely connected conductor in the base.

3. The article of manufacture of claim 2 wherein the cover (b) is further characterized as having slots located immediately over said adjustable conductive jumper tap bar for the insertion of stabs to connect said tap bar and further characterized in that said cover is provided with a conductor having at least two stabs fitted through said slots to connect said tap bars to thereby complete said incompletely connected conductor.

4. The article of manufacture of claim 1 wherein the cover (b) is further characterized as having slots located immediately over said adjustable conductive jumper tap bar for the insertion of stabs to connect to said tap bar.

* * * * *